United States Patent
Shin et al.

(10) Patent No.: US 8,724,567 B2
(45) Date of Patent: May 13, 2014

(54) METHOD AND APPARATUS USING FRAME STRUCTURE FOR WIRELESS MESH NETWORKS

(75) Inventors: Wooram Shin, Daejeon (KR); Hyun Jae Kim, Incheon (KR); Anseok Lee, Daejeon (KR); Ji Hyung Kim, Daejeon (KR); Keun Young Kim, Seongnam-si (KR); Kwang Jae Lim, Daejeon (KR); Dong Seung Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 275 days.

(21) Appl. No.: 13/194,236

(22) Filed: Jul. 29, 2011

(65) Prior Publication Data

US 2012/0093099 A1     Apr. 19, 2012

(30) Foreign Application Priority Data

Aug. 3, 2010    (KR) .................. 10-2010-0075081
Dec. 23, 2010   (KR) .................. 10-2010-0133118

(51) Int. Cl.
*H04W 4/00* (2009.01)

(52) U.S. Cl.
USPC ............ 370/329; 370/208; 370/343; 455/502

(58) Field of Classification Search
USPC .......... 370/208, 295, 329, 343, 478; 455/403, 455/443, 502
See application file for complete search history.

(56) References Cited

U.S. PATENT DOCUMENTS

| | | | |
|---|---|---|---|
| 2004/0208152 A1* | 10/2004 | Perkins et al. | 370/338 |
| 2010/0316014 A1* | 12/2010 | Choi et al. | 370/329 |
| 2011/0002243 A1* | 1/2011 | Sherman et al. | 370/280 |
| 2011/0103494 A1* | 5/2011 | Ahmadi | 375/260 |
| 2011/0141981 A1* | 6/2011 | Ahmadi et al. | 370/329 |
| 2011/0182253 A1* | 7/2011 | Shekalim | 370/329 |
| 2013/0028206 A1* | 1/2013 | Cho et al. | 370/329 |

OTHER PUBLICATIONS

IEEE Standard for Local and metropolitan area networks Part 16: Air Interface for Fixed Broadband Wireless Access Systems, Oct. 1, 2004.

* cited by examiner

*Primary Examiner* — Awet Haile
(74) *Attorney, Agent, or Firm* — Staas & Halsey LLP (57) ABSTRACT

Provided is a frame structure designed for distributed access control and OFDMA transmission in a wireless mesh network. Also, a communication method and a network node based on the frame structure are provided. Mesh nodes included in the wireless mesh network may use the frame structure and thus, may have a high prospect of transmitting a network configuration information message and scheduling information for obtaining a resource. Also, a scheduling process of the mesh nodes may be completed within a short period based on the frame structure.

16 Claims, 12 Drawing Sheets

METHOD AND APPARATUS USING FRAME STRUCTURE FOR WIRELESS MESH NETWORKS

CROSS-REFERENCE TO RELATED APPLICATION(S)

This application claims the benefit of Korean Patent Application Nos. 10-2010-0075081 and 10-2010-0133118, filed on Aug. 3, 2010 and Dec. 23, 2010, respectively, in the Korean Intellectual Property Office, the disclosures of which are incorporated herein by reference.

BACKGROUND

1. Field of the Invention

The present invention relates to a method and apparatus for performing communication based on a frame structure in a wireless mesh network.

2. Description of the Related Art

A conventional frame structure used in a wireless mesh network is designed based on time division multiplexing access (TDMA)-based transmission, and does not consider mobility of mesh nodes.

For high speed transmission, a broadband-based frame structure is designed based on an orthogonal frequency division multiplexing (OFDM) scheme.

An OFDM-based transmission is inappropriate for an environment having a wide coverage since power is limited. The OFDM-based transmission may not provide a sufficient opportunity of transmission for a distributed access control-based medium access control (MAC) protocol, and may reduce a spatial reuse factor.

Information associated with a node adjacent to each of the mesh nodes changes relatively fast, since the mesh nodes move. Therefore, when a mesh node does not obtain a transmission opportunity sufficiently fast, performance of a total system may be deteriorated.

A scheduling process in which a mesh node obtains a resource may also be robust against mobility, and may be required to satisfy a delay.

Therefore, there is a desire for an orthogonal frequency division multiple access (OFDMA) transmission-based frame structure that overcomes the drawback of the wide coverage. The frame structure may increase an opportunity of transmitting a broadcast message and a scheduling message for obtaining a resource. Accordingly, the frame structure may be robust against the mobility, and may also enable high speed data transmission.

SUMMARY

An aspect of the present invention provides a frame structure for a wireless mesh network.

Another aspect of the present invention also provides an apparatus and method that uses a frame structure for a wireless mesh network.

According to an aspect of the present invention, there is provided a super-frame (SU) used by nodes in an orthogonal frequency division multiple access (OFDMA)-based wireless mesh network for data transmission and distributed access control, the SU including at least one frame, and a first frame of the at least one frame is a network control frame (NCF) used by the nodes to broadcast information associated with a configuration of the network and information associated with an adjacent node, and remaining frames are at least one scheduling and data frame (SDF) to broadcast distributed scheduling information and to transmit data.

Each frame may include at least one sub-frame (SF), at least one switching gap (SG), disposed between two neighboring SFs among the at least one SF, to switch between transmission and reception, and a switching gap of an end of frame (EF) to adjust a length of the NCF disposed behind a last SF of the at least one SF, and to switch between transmission and reception between the last SF and a first SF of a subsequent frame of a corresponding frame.

A length of the SG and a length of the EF may be determined based on a configuration of the NCF, the SF, and an orthogonal frequency division multiplexing (OFDM) symbol.

The NCF may include at least one. SF, and a first SF of the at least one SF may be a network entry sub-frame (NENT SF), and remaining SFs may be network configuration sub-frames (NCFG SFs) or data sub-frames (DATA SFs), and the NENT SF may be a section where a first node attempts access to perform an entry process with respect to the wireless mesh network, and the NCFG SF may be a section where a second node included in the wireless mesh network broadcasts information associated with the second node and collected network information associated with neighboring nodes.

An allocation ratio of the NCFG SF to the DATA SF included in the NCF may be variably determined based on a size of the wireless mesh network.

The NENT may include a preamble including two OFDM symbols, and data symbols including six OFDM symbols; and the preamble may be used to adjust a timing and power for the entry process with respect to the wireless mesh network, and the data symbols may be used to transmit a message associated with the NENT.

The NCFG may include a preamble including one OFDM symbol, and data symbols including five OFDM symbols, and the preamble may be used for network synchronization with adjacent nodes in the wireless mesh network, and the data symbols may be used to broadcast information associated with the nodes in the wireless mesh network.

The SDF may include at least one SF, and a first SF and a fourth SF of the at least one SF may be distributed scheduling sub-frames (DSCH SFs) or DATA SFs, and remaining SFs may be DATA SFs.

A period of the DSCH SF in the SDF may be determined based on at least one of a size of the wireless mesh network, a density of nodes included in the wireless mesh network, and information associated with whether occupancy of a resource may be continued by one resource reservation.

The DSCH SF and the DATA SF may include SDF configuration information required when the nodes in the wireless mesh network use SDFs having the same structure.

The SDF configuration information may include at least one of allocation information associated with the DSCH SF, period information associated with the DSCH SF, and information associated with whether an SG is used in the SDF.

The structure of the SDF may be determined based on a number of the nodes in the wireless mesh network and an amount of data transmitted among the nodes.

The DSCH SF may include a preamble including one OFDM symbol, and data symbols including six OFDM symbols, and the preamble may be used for network synchronization with adjacent nodes in the wireless mesh network, and the data symbols may be used to transmit and receive scheduling information for occupying a resource.

The preamble may be used to measure a channel, so as to obtain a channel quality indicator (CQI), a precoding matrix index (PMI), and the like, which are to be fed back by a target node that receives data to a request node that transmits data.

The data symbols may be distributed to a plurality of sub-channels divided based on a frequency domain.

Each sub-channel may include 18 sub-carriers, and each sub-carrier may include six OFDM symbols.

According to an aspect of the present invention, there is provided a communication method for data transmission and distributed access control of a first node and a second node in an OFDMA-based wireless mesh network, the method including transmitting an SU to a terminal in the wireless mesh network, and the transmitting may include transmitting an NCF used by the nodes to broadcast information associated with a configuration of the network and information associated with an adjacent node, and transmitting at least one SDF used to broadcast distributed scheduling information and to transmit data.

According to an aspect of the present invention, there is provided a node included in an OFDMA-based wireless mesh network, the node including a controller to generate an SU used for data transmission and distributed access control, and a transceiver to transmit the SU to an opponent node in the wireless mesh network, and the SU may include an NCF used by nodes to broadcast information associated with a configuration of the network and information associated with an adjacent node, and at least one SDF used to broadcast distributed scheduling information and to transmit data.

Additional aspects, features, and/or advantages of the invention will be set forth in part in the description which follows and, in part, will be apparent from the description, or may be learned by practice of the invention.

Effect

Example embodiments may provide a frame structure for a wireless mesh network.

Example embodiments may provide an apparatus and method that uses a frame structure for a wireless mesh network.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Reference will now be made in detail to embodiments of the present invention, examples of which are illustrated in the accompanying drawings, wherein like reference numerals refer to the like elements throughout. Embodiments are described below to explain the present invention by referring to the figures.

Figure 1:
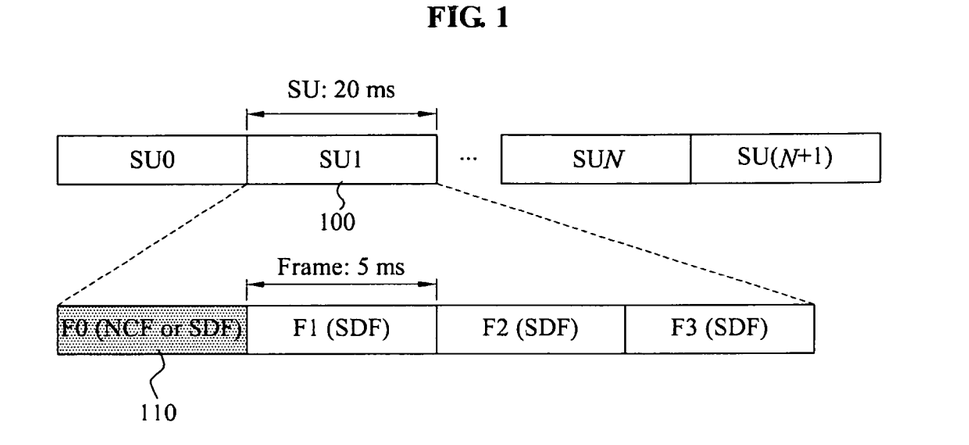
FIG. 1 illustrates a structure of a frame used in a wireless mesh network according to an embodiment of the present invention.

FIG. 1 illustrates a structure of a frame used in a wireless mesh network according to an embodiment of the present invention.

The super-frame (SU) 110 is a frame of a largest unit used in the wireless mesh network. Nodes included in an orthogonal frequency division multiplex access (OFDMA)-based wireless mesh network may communicate using SU 100 for data transmission and distributed access control.

The SU 100 is a basic unit for a period unit of a message having a long periodicity, for example, a network entry and network configuration.

The single SU 100 may be used for 20 milliseconds (ms). That is, a length of the SU 100 may be 20 ms.

The SU 100 may include at least one frame. For example, an SU may include four frames, and a length of each frame may be 5 ms.

Each frame may include at least one sub-frame (SF). For example, a frame may include six SFs.

The SF may be classified into the types based on a number of orthogonal frequency division multiplexing (OFDM) symbols, that is, a number of data symbols. In this instance, the OFDM symbols correspond to data that excludes a reference signal, for example, a preamble, a mid-amble, and a training symbol, from the SF.

1) Type-1 SF: an SF including OFDM symbols corresponding to five pieces of data

1) Type-2 SF: an SF including OFDM symbols corresponding to six pieces of data

1) Type-3 SF: an SF including OFDM symbols corresponding to seven pieces of data A switching gap (SG) is disposed between SFs that is, between two neighboring SFs. Here, the SG is used to switch between transmission and reception.

A switching gap of the end of frame (EF) is disposed behind a last SF among at least one SF included in a frame. The EF may be used to switch between transmission and reception between the last SF of the frame and a first SF of a subsequent frame, and may be used to adjust a length of a frame to, for example, 5 ms.

In general, a length of an SG is 100 us and a length of an EF is 157.143 us.

A length of scheduling and data frame (SDF) may be 157.143 us, 128.57 us, or 99.99 us, based on a structure of the SDF, which will be described with reference to FIGS. 3 through 5.

The length of the SG and the length of the EF is obtained by assuming that ¼ cyclic prefix (CP) ratio is applied so that an one-way delay of a coverage of 5 kilometers (km) is sufficiently included in a guard interval of an OFDM symbol of which a length of an FFT is 1024 and a length of an active symbol is 91.4 us.

The length of the SG and the length of the EF may be determined based on a configuration of the frame, the SF, and the OFDM symbol. That is, the length of the SG and the length of the EF may change based on the configuration of the frame, the SF, and the OFDM symbol.

As described in the foregoing, the frame may be classified, in detail, based on a basic length and a structure of each frame unit, and based on a use of the frame.

The frame may be a network control frame (NCF). The frame may be an SDF. That is, examples of a frame type may include the NCF and the SDF.

The NCF may be used to broadcast information associated with a configuration of a wireless mesh network of each node, and to broadcast information associated with an adjacent node.

The SDF may be used to broadcast distributed scheduling information, and to transmit data.

A first frame 110 of the SU 100 may be an NCF or an SDF. Remaining frames excluding the first frame 110 of the SU 100 may be SDFs.

Figure 2:
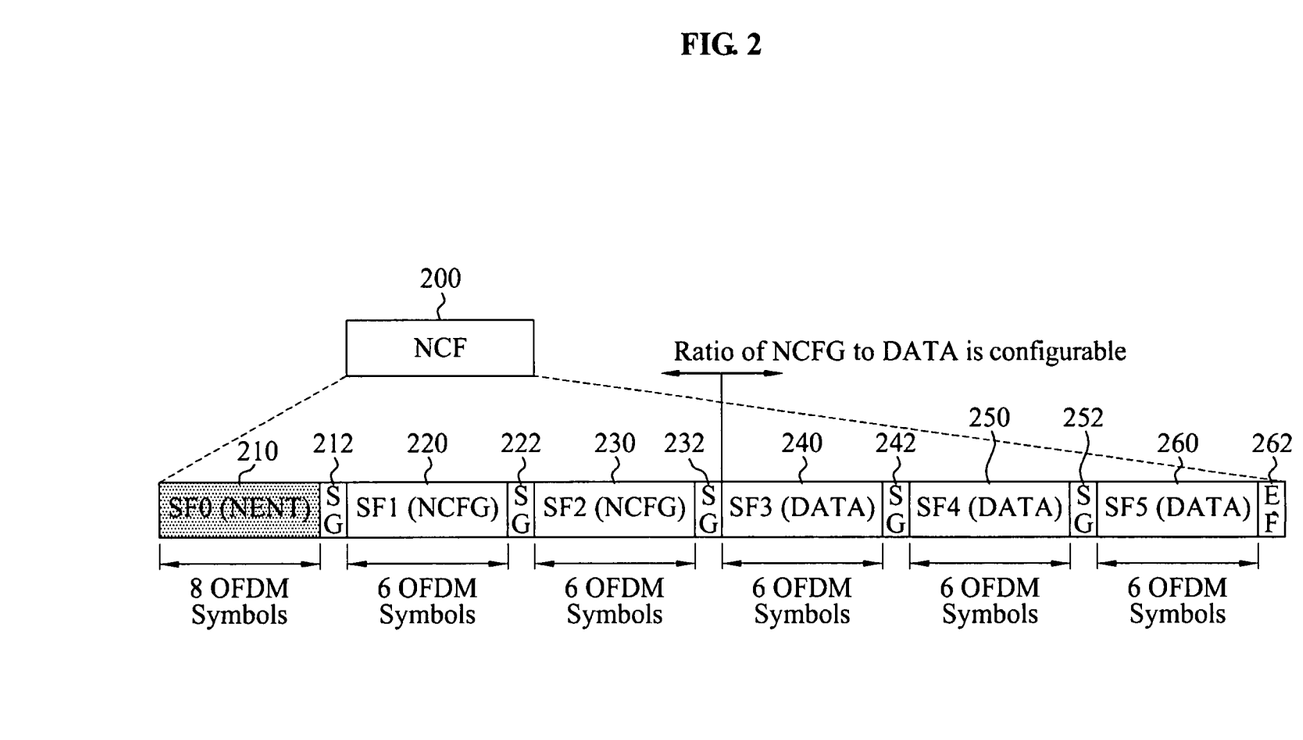
FIG. 2 illustrates a structure of a network control frame (NCF) according to an embodiment of the present invention.

FIG. 2 illustrates a structure of an NCF according to an embodiment of the present invention.

An NCF 200 may include an SF, an SG, and an EF.

At least one SF included in the NCF 200 may be identified by a number, increased by one from zero. For example, a first SF included in the SDF may be "SF0".

The NCF 200 may include an "SF0" 210, an "SG" 212, an "SF1" 220, an "SG" 222, an "SF2" 230, an "SG" 232, an "SF3" 240, an "SG" 242, an "SF4" 250, an "SG" 252, an "SF5" 260, and an "EF" 262, sequentially.

The first SF corresponding to the "SF0" 210 may be used as a network entry (NENT) SF.

A second SF corresponding to the "SF1" 220 and a third SF corresponding to the "SF2" 230 may be used as network configuration (NCFG) SFs.

Remaining SFs, that is, the "SF3" 240, the "SF4" 250, and the "SF5" 260, may be used as data (DATA) SFs.

The NENT SF may correspond to a section where a predetermined node attempts access to perform an entry process when the predetermined node is to enter a wireless mesh network including nodes in advance.

The NCFG SF may correspond to a section used by each node included in the wireless mesh to broadcast information associated with a corresponding node and collected network information associated with neighboring nodes.

In a network environment with a low density of nodes, each node may be provided with a sufficient opportunity of broadcasting, only with a small number of NCFG SFs. Therefore, remaining SFs may be used as DATA SFs for data transmission and thus, resource efficiency may be improved.

Accordingly, remaining SFs 220, 230, 240, 250, and 260 excluding the "SF0" 210, may be NCFG SFs or DATA SFs, and an allocation ratio of the NCFG SF to the DATA SF included in the NCF 200 may be variably configured based on a size of the wireless mesh network.

Figure 3:
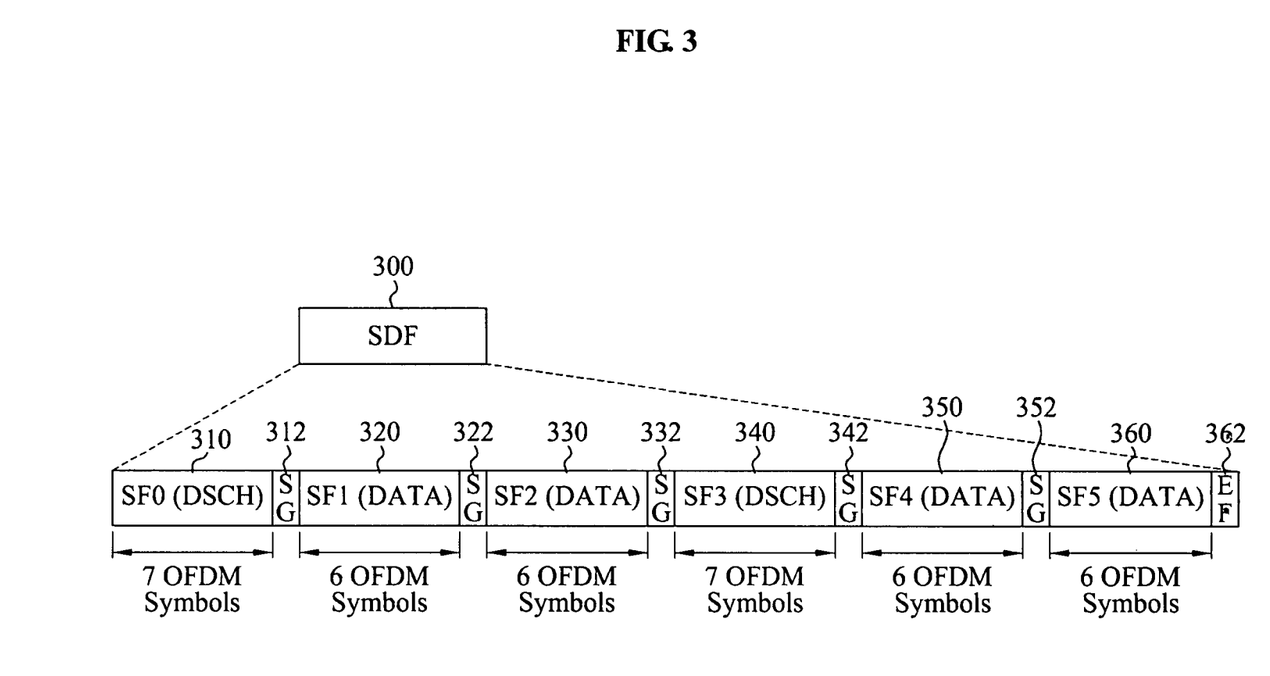
FIG. 3 illustrates a structure of a scheduling and data frame (SDF) according to an embodiment of the present invention.

FIG. 3 illustrates a structure of an SDF according to an embodiment of the present invention.

A first SDF 300 may include an "SF0" 310, an "SG" 312, an "SF1" 320, an "SG" 322, an "SF2" 330, an "SG" 332, an "SF3" 340, an "SG" 342, an "SF4" 350, an "SG" 352, an "SF5" 360, and an "EF" 362, sequentially.

A first SF corresponding to the "SF0" 310 and a fourth SF corresponding to the "SF3" 340 are distributed scheduling (DSCH) SFs.

Remaining SFs, that is, the "SF1" 320, the "SF2" 330, the "SF4" 350, and the "SF5" 360, may be DATA SFs.

Each of the "SF0" 310 and the "SF3" 340 may include seven OFDM symbols.

Each of the "SF1" 320, the "SF2" 330, the "SF4" 350, and the "SF5" 360 may include six OFDM symbols.

As illustrated in FIG. 3, the first SDF 300 may include at least two DSCH SFs.

Figure 4:
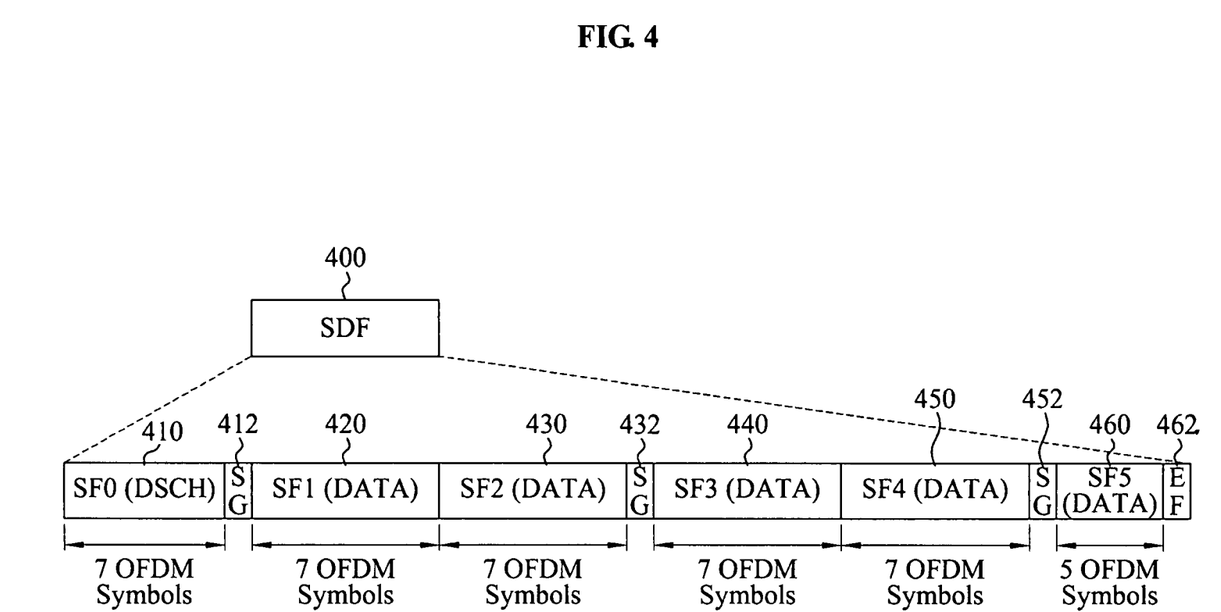
FIG. 4 illustrates a structure of another SDF according to an embodiment of the present invention.

FIG. 4 illustrates a structure of another SDF according to an embodiment of the present invention A second SDF 400 may include an "SF0" 410, an "SG" 412, an "SF1" 420, an "SF2" 430, an "SG" 432, an "SF3" 440, an "SF4" 450, an "SG" 452, an "SF5" 460, and an "EF" 462, sequentially.

The "SF0" 410 may be a DSCH SF.

Remaining SFs, that is, the "SF1" 420, the "SF2" 430, the "SF3" 440, the "SF4" 450, and the "SF5" 460" may be DATA SFs.

Each of the "SF0" 410, the "SF1" 420, the "SF2" 430, the "SF3" 440, the "SF4" 450 may include seven OFDM symbols.

The "SF5" 460 may include five OFDM symbols.

When compared to the structure of the first SDF 300, the second SDF 400 may have a structure that more reduces overhead due to an SG, and that more improves frequency efficiency by allocating a resource by one or two SFs.

Figure 5:
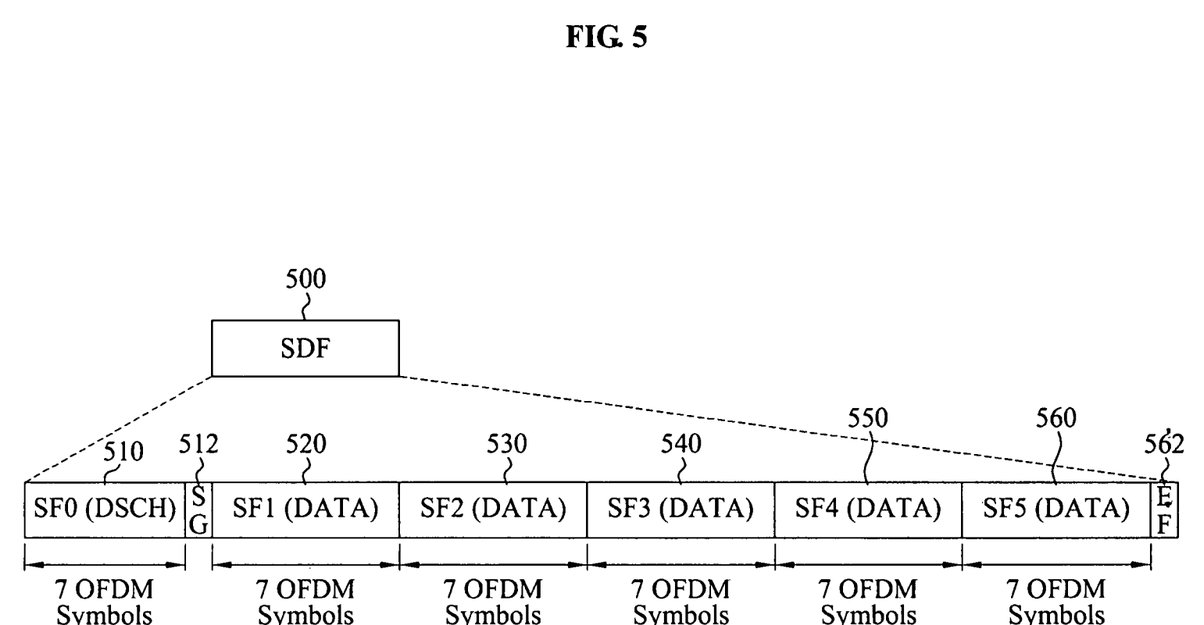
FIG. 5 illustrates a structure of still another SDF according to an embodiment of the present invention.

FIG. 5 illustrates a structure of still another SDF according to an embodiment of the present invention.

A third SDF 500 may include an "SF0" 510, an "SG" 512, an "SF1" 520, an "SF2" 530, an "SF3" 540, an "SF4" 550, an "SF5" 560, and an "EF" 562, sequentially.

The "SF0" 510 may be a DSCH SF.

Remaining SFs, that is, the "SF1" 520, the "SF2" 530, the "SF3" 540, the "SF4" 550, and the "SF5" 560 may be DATA SFs.

Each of the "SF0" 510, the "SF1" 520, the "SF2" 530, the "SF3" 540, the "SF4" 550, and the "SF5" 560 may include seven OFDM symbols.

When compared to the structures of the SDFs 300 and 400, the third SDF 500 may have a structure that further reduces overhead due to an SG, and that better improves frequency efficiency by allocating a resource by five SFs.

To configure the SDF 300, 400, or 500 in the same structure, a DSCH SF and a DATA SF may broadcast SDF configuration information within an adjacent network. That is, the DSCH SF and the DATA SF may include the SDF configuration information required for nodes included in the wireless mesh node to use SDFs having the same structure.

The SDF configuration information may include at least one of allocation information associated with the DSCH SF, period information associated with the DSCH SF, and information associated with whether an SG is used in the SDF.

The structure of the SDF or the SDF configuration information may be determined based on features: 1) a number of nodes included in the wireless mesh network; and 2) an amount of data transmitted among the nodes-included in the wireless mesh network.

A period of the DSCH SF within the SDF may be determined based on at least one of a size of the wireless mesh network, a density of nodes included in the wireless mesh network, and information associated with whether occupancy of a resource is continued by one resource reservation. That is, when the size of the wireless mesh network is small, when the density of the nodes is low, or when a resource is continuously occupied by one resource reservation, for example, a persistent allocation, a transmission opportunity for resource reservation may be lowered. Therefore, the period of the DSCH SF may be lengthened so as to be longer than each SF. That is, a predetermined SDF may not include a DSCH SF. In the structures of the SDFs 200, 300, and 400 described in the foregoing, a DSCH SF may be replaced with a DATA SF, based on a period of the DSCH. In this instance, the replacement may improve data transmission efficiency.

Figure 6:
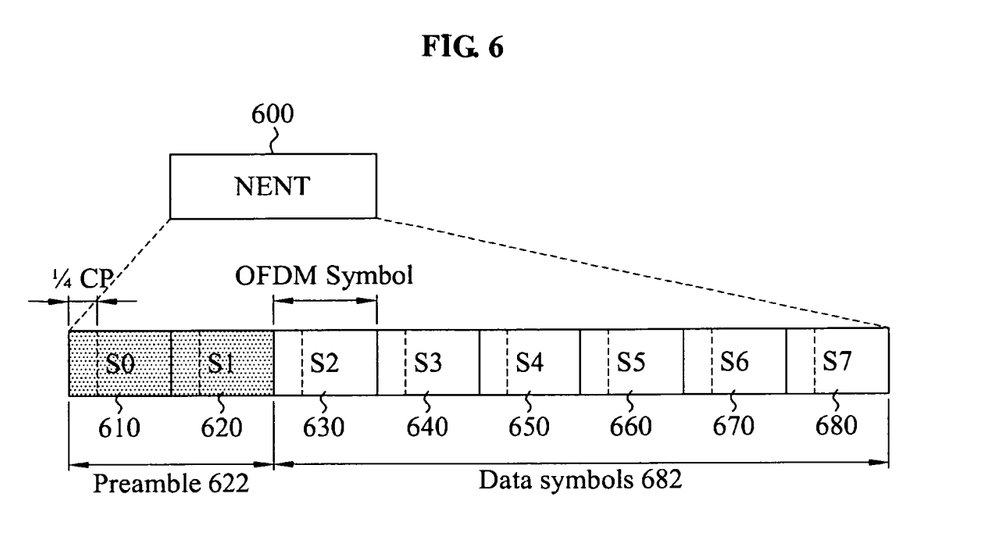
FIG. 6 illustrates a structure of a network entry sub-frame (NENT SF) according to an embodiment of the present invention.

FIG. 6 illustrates a structure of an NENT SF according to an embodiment of the present invention.

An NENT SF 600 may include a preamble 622 including two OFDM symbols 610 and 620, and may include data symbols 682 including six OFDM symbols 630 through 680.

A node may use two preambles 622 for initial network entry so that an initial ranging process may be performed. The preamble 6220 may be used to adjust a timing and a power.

The data symbols 682 may be used to transmit a message associated with the NENT SF 600.

Figure 7:
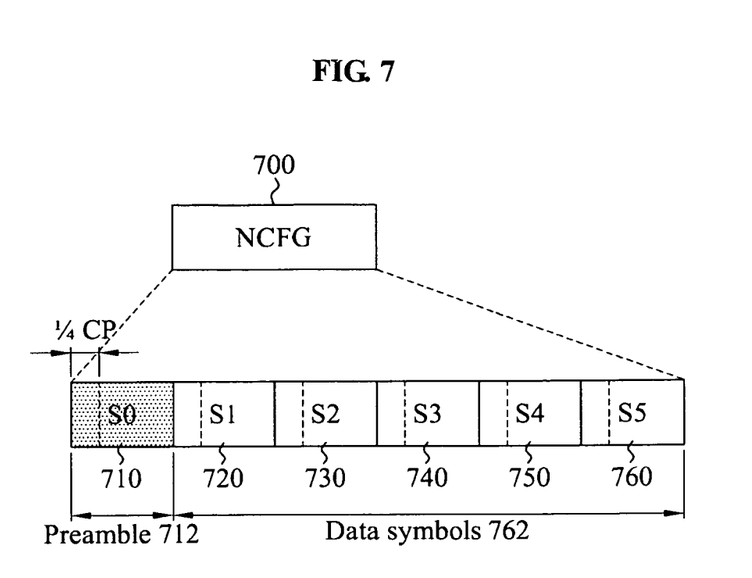
FIG. 7 illustrates a structure of a network configuration sub-frame (NCFG-SF) according to an embodiment of the present invention.

FIG. 7 illustrates a structure of an NCFG SF according to an embodiment of the present invention.

An NCFG SF 700 may include a preamble 712 including one OFDM symbol 710, and may include data symbols 762 including five OFDM symbols 720 through 760.

The preamble 712 may be used for network synchronization with adjacent nodes in a wireless mesh network.

The data symbols 762 may be used to broadcast information associated with nodes included in the wireless mesh network, that is, information associated a node that broadcasts an NCFG SF and information associated with neighboring nodes.

Therefore, each node included in the wireless mesh network may obtain information associated with nodes physically existing within a range of 2-hop.

Figure 8:
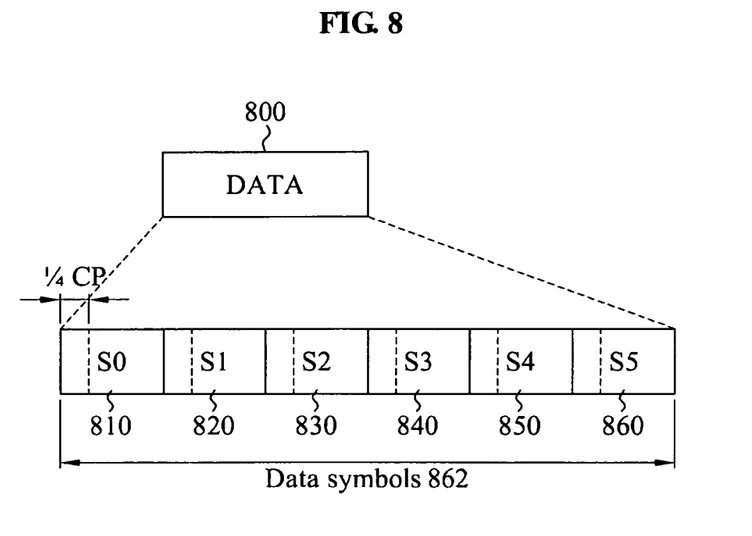
FIG. 8 illustrates a structure of a data sub-frame (DATA SF) according to an embodiment of the present invention.

FIG. 8 illustrates a structure of a DATA SF 800 according to an embodiment of the present invention.

A DATA SF 800 may include data symbols 862 including six OFDM symbols 810 through 860. The DATA SF 800 may allocate a data burst to the six OFDM symbols. The data symbols 862 or the DATA SF 800 may be used to transmit data.

In the DATA SF 800, a preamble may not be included, as opposed to in the NENT SF 600, and in the NCFG SF 700.

In the DATA SF 800, a pilot signal included in the data symbols 862 may be used as a reference signal for demodulation.

The DATA SF 800 may be configured as one of three sub-frame types including a type-1 sub-frame, a type-2 sub-frame, and a type-3 sub-frame. The DATA SF 800 may be the type-2 sub-frame.

Figure 9:
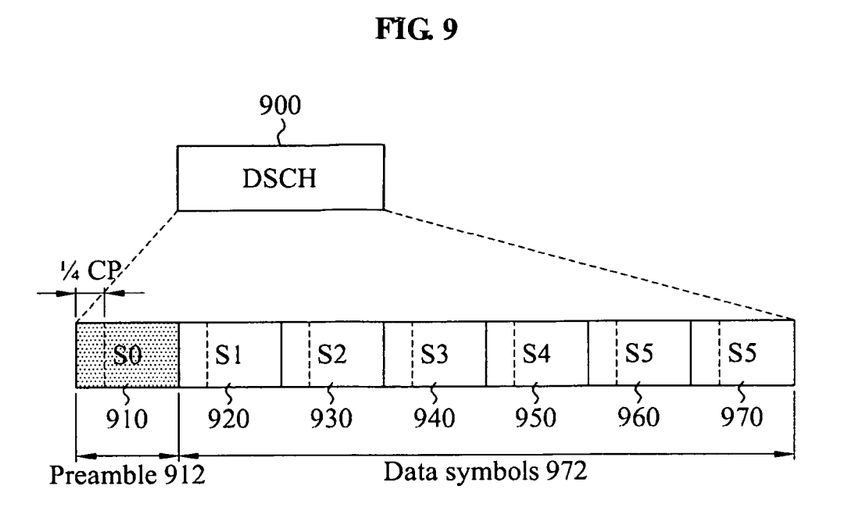
FIG. 9 illustrates a structure of a distributed scheduling sub-frame (DSCH SF) according to an embodiment of the present invention.

FIG. 9 illustrates a structure of a DSCH SF according to an embodiment of the present invention.

A DCSH SF 900 may include a preamble 912 including one OFDM symbol 910, and may include data symbols 972 including six OFDM symbols 920 through 970.

The preamble 912 may be used for network synchronization with adjacent nodes in a wireless mesh network, in the same manner as in the NCFG SF 700.

The preamble 912 may be used for channel measurement or channel estimation so as to obtain a channel quality indicator (CQI), a precoding matrix index (PMI), and the like. The CQI, the PMI and the like are to be fed back, by a target node that receives data, to a request node for link adaptation (LA), a closed-loop (CL), a multiple-input and multiple output (MIMO).

The preamble 912 may be used to control power.

In the structures of the SFs 600, 700, 800, and 900, a CP ratio of all OFDM symbols is ¼. The structures or the CP ratio may be designed when a total symbol length is 114.286 us.

The data symbols 972 may be used to transmit and receive, between a request node and a target node, scheduling information for occupying a resource.

Figure 10:
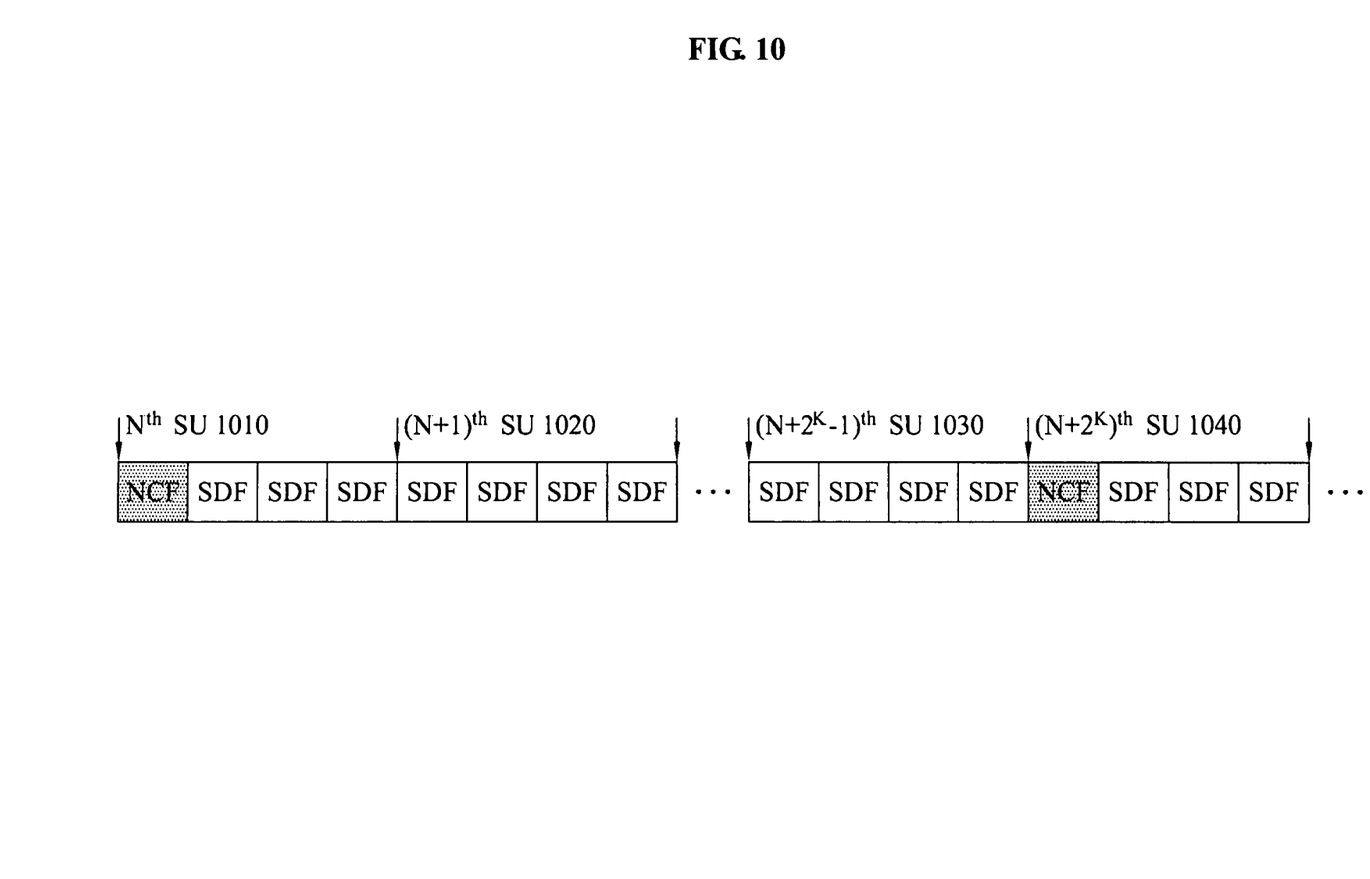
FIG. 10 illustrates allocation of an NCF based on a period according to an embodiment of the present invention.

FIG. 10 illustrates allocation of an NCF based on a period according to an embodiment of the present invention.

The NCF may be periodically allocated to a first frame of an SU based on a period of $2^K$ SUs, using an SU as a basic unit. In this example, K is an integer grater than or equal to zero. When a period unit of an SU is long, allocation may be performed based on a period of $2^K$ frames. Here, K is an integer greater than or equal to zero.

Referring to FIG. 10, an NCF is allocated to an $N^{th}$ SU 1010 and to an $(N+2^K)^{th}$ SU 1040. An NCF is absent in $(N+1)^{th}$ SU 1020 and in $(N+2^K-1)^{th}$ SU 1030.

Figure 11:
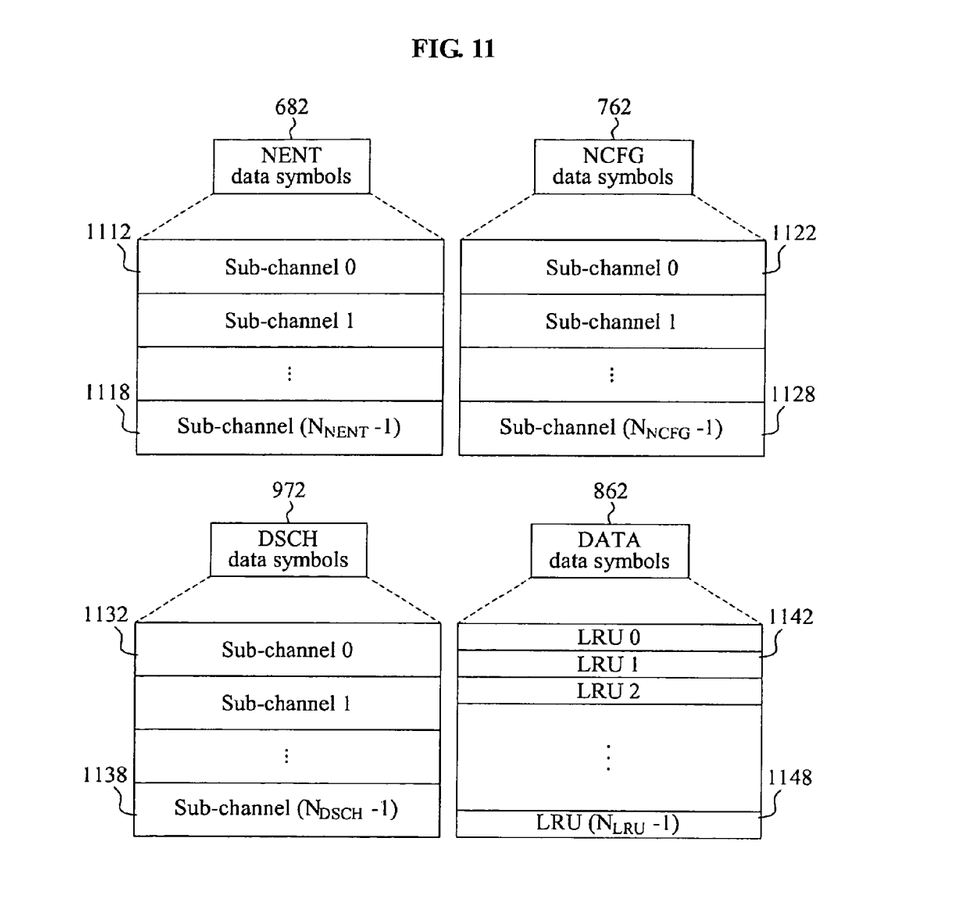
FIG. 11 illustrates distribution of sub-channels of data symbols included in an SF according to an embodiment of the present invention.

FIG. 11 illustrates distribution of sub-channels of data symbols included in an SF according to an embodiment of the present invention.

Data symbols, for example, data symbols 682, 762, 972, and 862, in an SF may be distributed to a plurality of sub-channels divided based on a frequency domain.

The data symbols 682 of the NENT SF 600 may include $N_{NENT}$ sub-channels, from a "sub-channel 0" 1112 to a "sub-channel $(N_{NENT}-1)$" 1118.

Each sub-channel of data symbols 682 of the NENT SF 600 may be configured to include an 18×6 logical resource unit (LRU) bundle or an 18×5 LRU bundle (a number of sub-carriers×a number of OFDM symbols). That is, each sub-channel is configured to include 18 sub-carriers, and each sub-carrier is configured to include five or six OFDM symbols.

Sub-carriers of an LRU are not physically adjacent to each other. The LRU is a logical unit configured to include sub-carriers become adjacent to each other, after rearrangement of the sub-carriers, such as sub-channelization or permutation.

The data symbols 972 of the DSCH SF 900 may be configured as an 18×6 LRU bundle.

Messages of the NENT SF 600, the NCFG SF 700, and the DSCH SF 900 are relatively large. Therefore, the NENT SF 600, the NCFG SF 700, and the DSCH SF 900 may be configured to include sub-channels using an LRU bundle. A size of an LRU bundle may be defined in a system parameter.

The data symbols 762 of the NCFG SF 700 may include $N_{NCFG}$ sub-channels, from a "sub-channel 0" 1122 to a "$(N_{NCFG}-1)$ sub-channel" 1128.

The data symbols 972 of the DSCH SF 900 may include $N_{DSCH}$ sub-channels, from a "sub-channel 0" 1132 to a "sub-channel $(N_{DSCH}-1)$" 1138.

Conversely, the DATA SF 800 uses an LRU as a basic resource unit to improve efficiency. When a resource between a transmission node and a reception node is reserved, a predetermined number of LRU bundles may be allocated. Therefore, varied burst sizes may be provided.

The data symbols 862 of the DATA SF 800 may include $N_{LRU}$ LRUs, from an "LRU 0" 1142 to an "LRU($N_{LRU}-1$)" 1148.

A configurable LRU unit of the DATA SF 800 may be 18×5, 18×6, and 18×7.

A preamble of each SF may be transmitted, by a plurality of nodes, to be distributed to a whole band. Each node may transmit a preamble of a predetermined sequence and thus, collision between nodes may be prevented.

The preamble and sub-channels of data symbols of each SF may be transmitted to a plurality of neighboring nodes physically existing within a range of 1-hop.

The nodes within the range of 1-hop may not simultaneously transmit or receive different sub-channels. Accordingly, the nodes within the scope of 1-hop may need to be scheduled and thus, the nodes may use sub-channels separately in terms of time.

Conversely, nodes within the scope of 2-hop may transmit SFs and the like using different sub-channels. Therefore, a spatial reusability may be improved, and the nodes may promptly obtain a transmission opportunity.

The numerical values described in the foregoing may vary based on a configuration of an SU, a frame, a sub-frame, and an OFDM symbol. In this example, uses and sub-channel configurations of an NCF, an SDF, an NENT SF, an NCFG SF, a DSCH SF, and a DATA SF may be the same.

A length of an OFDM symbol of the NENT SF, the NCFG SF, and the DSCH SF may change based on a design of a preamble and a length of data symbols.

Also, locations of the NENT SF, the NCFG SF, the DSCH SF, and the DATA SF may change based on a use of a corresponding frame.

When an acknowledgement (ACK) is required to be fed back so as to determine whether data is successfully received a design that replaces a last DATA SF with an ACK SF resource may be allowed.

When an ACK feedback delay is limited within one frame, a position of the DSCH SF, the NENT SF, or the NCFG SF may change to a position of an SF immediately before the ACK, for a decoding time of the last DATA SF before the ACK SF.

Figure 12:
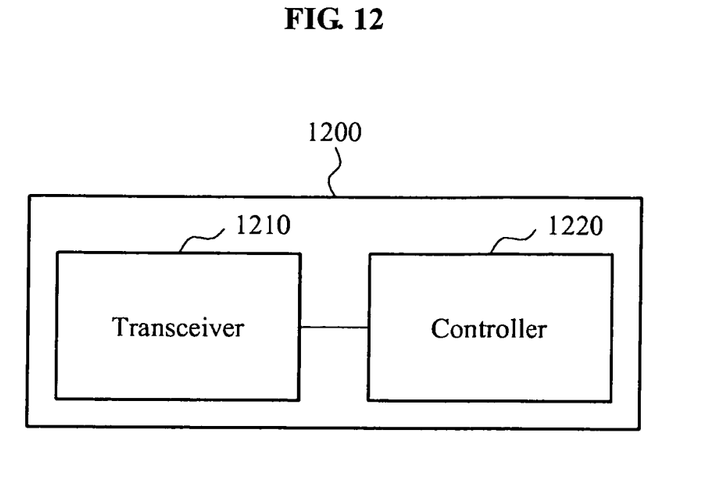
FIG. 12 illustrates a configuration of a node included in an OFDMA-based wireless mesh network according to an embodiment of the present invention.

FIG. 12 illustrates a configuration of a node 1200 included in an OFDMA-based wireless mesh network according to an embodiment of the present invention.

The node 1200 may include a transceiver 1210 and a controller 1220.

The controller 1220 may generate an SU, a frame, a sub-frame, a preamble, a data symbol, an OFDM symbol, an LRU, and the like.

For example, the controller 1220 may generate an SU for data transmission and distributed access control.

The transceiver 1210 may transmit, to another node, the SU, the frame, the sub-frame, the preamble, the data symbol, the OFDM symbol, the LRU, and the like generated by the controller 1220, or may receive, from another node, an SU, a frame, a sub-frame, a preamble, a data symbol, an OFDM symbol, an LRU, and the like.

For example, the transceiver 1210 may transmit an SU to an opponent node in the wireless mesh network.

Descriptions provided with reference to FIGS. 1 through 12 may be applicable to the present embodiment and thus, detailed descriptions will be omitted for conciseness.

Descriptions provided with reference to FIGS. 1 through 11 may be applicable to a communication method for data transmission and distributed access control of a first node and a second node in the OFDMA-based wireless mesh network.

For example, the SU 100 of FIG. 1 may indicate a section where the first node transmits to an SU to the second node.

In FIG. 1, the SU 100 may be separated based on an NCF and an SDF. The NCF may indicate a section where the first node transmits an NCF to the second node, and the SDF may indicate a section where the first node transmits an SDF to the second node. This may be applicable to embodiments provided with reference to FIGS. 2 through 11.

The method according to the above-described embodiments of the present invention may be recorded in non-transitory computer readable media including program instructions to implement various operations embodied by a computer. The media may also include, alone or in combination with the program instructions, data files, data structures, and the like. Examples of non-transitory computer readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An orthogonal frequency division multiple access (OFDMA)-based wireless mesh network comprising:
   plurality of nodes;
   at least one of the plurality of nodes generate a super-frame (SU);
   wherein said super-frame comprising:
      plurality of frames
      wherein a first frame of the plurality of frames is a network control frame (NCF), and remaining frames are scheduling and data frames (SDF);
      broadcast information associated with a configuration of the wireless mesh network and information associated with an adjacent node using the NCF, and broadcast distributed scheduling information and data using the SDF;
   wherein the NCF comprises:
   plurality of sub-frames (SF);
   wherein a first SF of the plurality of SF is a network entry sub-frame (NENT SF), and remaining SFs are network configuration sub-frames (NCFG SFs) and data sub-frames (DATA SFs),
   wherein a first node attempts access to perform an entry process with respect to the wireless mesh network using the NENT SF, and;
   a second node included in the wireless mesh network broadcasts information associated with the second node and collected network information associated with neighboring nodes using the NCFG SF;
   wherein an allocation ratio of the NCFG SF to the DATA SF included in the NCF is variably determined based on a size of the wireless mesh network.

2. The SU of claim 1, wherein each frame comprises:
   at least one switching gap (SG), disposed between two neighboring SFs among the at least one SF, to switch between transmission and reception; and
   a switching gap of an end of frame (EF) to adjust a length of the NCF disposed behind a last SF of the at least one SF, and to switch between transmission and reception between the last SF and a first SF of a subsequent frame of a corresponding frame.

3. The SU of claim 2, wherein a length of the SG and a length of the EF is determined based on a configuration of the NCF, the SF, and an orthogonal frequency division multiplexing (OFDM) symbol.

4. The SU of claim 1, wherein the NENT comprises:
a preamble comprising two OFDM symbols; and
data symbols comprising six OFDM symbols;
wherein the preamble is used to adjust a timing and power for the entry process with respect to the wireless mesh network, and the data symbols is used to transmit a message associated with the NENT.

5. The SU of claim 1, wherein the NCFG comprises:
a preamble comprising one OFDM symbol; and
data symbols comprising five OFDM symbols,
wherein the preamble is used for network synchronization with adjacent nodes in the wireless mesh network, and the data symbols are used to broadcast information associated with the nodes in the wireless mesh network.

6. The SU of claim 1, wherein the SDF comprises:
at least one SF,
wherein a first SF and a fourth SF of the at least one SF are distributed scheduling sub-frames (DSCH SFs) or DATA SFs, and remaining SFs are DATA SFs.

7. The SU of claim 6, wherein a period of the DSCH SF in the SDF is determined based on at least one of a size of the wireless mesh network, a density of nodes included in the wireless mesh network, and information associated with whether occupancy of a resource is continued by one resource reservation.

8. The SU of claim 6, wherein the DSCH SF and the DATA SF comprises SDF configuration information required when the nodes in the wireless mesh network use SDFs having the same structure.

9. The SU of claim 8, wherein the SDF configuration information comprises at least one of allocation information associated with the DSCH SF, period information associated with the DSCH SF, and information associated with whether an SG is used in the SDF.

10. The SU of claim 8, wherein the structure of the SDF is determined based on a number of the nodes in the wireless mesh network and an amount of data transmitted among the nodes.

11. The SU of claim 6, wherein the DSCH SF comprises:
a preamble comprising one OFDM symbol; and
data symbols comprising six OFDM symbols,
wherein the preamble is used for network synchronization with adjacent nodes in the wireless mesh network, and the data symbols are used to transmit and receive scheduling information for occupying a resource.

12. The SU of claim 11, wherein the preamble is used to measure a channel, so as to obtain a channel quality indicator (Cal), a precoding matrix index (PMI) which are to be fed back by a target node that receives data to a request node that transmits data.

13. The SU of claim 11, wherein the data symbols are distributed to a plurality of sub-channels divided based on a frequency domain.

14. The SU of claim 13, wherein each sub-channel comprises 18 sub-carriers, and each sub-carrier comprises six OFDM symbols.

15. A communication method for data transmission and distributed access control of a first node and a second node in an orthogonal frequency division multiple access (OFDMA)-based wireless mesh network, the method comprising:
generating a super-frame (SU);
transmitting the super-frame to a terminal in the wireless mesh network,
wherein said super-frame comprising:
plurality of frames;
wherein a first frame of the plurality of frames is a network control frame (NCF), and remaining frames are scheduling and data frames (SDF);
broadcasting information associated with a configuration of the network and information associated with an adjacent node using the NCF; and broadcasting distributed scheduling information and data using the SDF;
wherein the NCF comprises: plurality of sub-frames (SF);
wherein a first SF of the plurality of SF is a network entry sub-frame (NENT SF), and remaining SFs are network configuration sub-frames (NCFG SFs) and data sub-frames (DATA SFs),
wherein the first node attempts access to perform an entry process with respect to the wireless mesh network using the NENT SF, and;
the second node included in the wireless mesh network broadcasts information associated with the second node and collected network information associated with neighboring nodes using the NCFG SF;
wherein an allocation ratio of the NCFG SF to the DATA SF included in the NCF is variably determined based on a size of the wireless mesh network.

16. A node included in an orthogonal frequency division multiple access (OFDMA)-based wireless mesh network, the node comprising:
a controller to generate a super-frame (SU) used for data transmission and distributed access control; and
a transceiver to transmit the SU to an opponent node in the wireless mesh network, wherein the SU comprises:
plurality of frames;
wherein a first frame of the plurality of frames is a network control frame (NCF), and remaining frames are scheduling and data frames (SDF);
broadcast information associated with a configuration of the network and information associated with an adjacent node using the NCF; and
broadcast distributed scheduling information and data using the SDF;
wherein the NCF comprises: plurality of sub-frames (SF);
wherein a first SF of the plurality of SF is a network entry sub-frame (NENT SF), and remaining SFs are network configuration sub-frames (NCFG SFs) and data sub-frames (DATA SFs),
wherein a first node attempts access to perform an entry process with respect to the wireless mesh network using the NENT SF, and;
a second node included in the wireless mesh network broadcasts information associated with the second node and collected network information associated with neighboring nodes using the NCFG SF;
wherein an allocation ratio of the NCFG SF to the DATA SF included in the NCF is variably determined based on a size of the wireless mesh network.

* * * * *